July 13, 1954     E. V. HARDWAY, JR     2,683,514
SYNCHRONOUS CONTROL DEVICE
Filed Nov. 20, 1950     3 Sheets-Sheet 1

Inventor
EDWARD V. HARDWAY, Jr.

By Stone, Boyden & Mack
Attorneys.

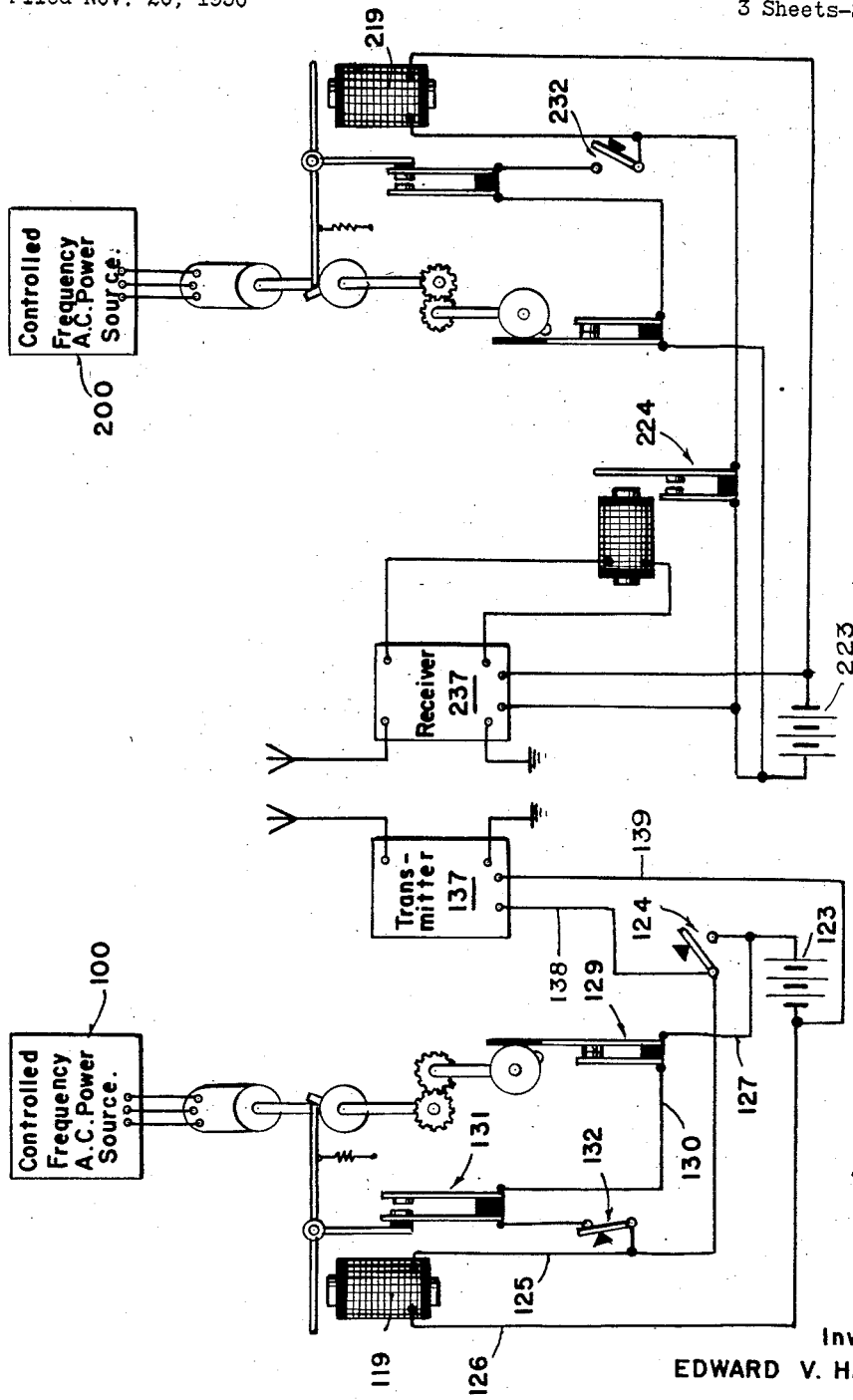

Patented July 13, 1954

2,683,514

UNITED STATES PATENT OFFICE 2,683,514

SYNCHRONOUS CONTROL DEVICE

Edward V. Hardway, Jr., Richmond, Va., assignor, by mesne assignments, to Flight Research, Incorporated, a corporation of Virginia Application November 20, 1950, Serial No. 196,600

11 Claims. (Cl. 192—116.5)

This invention relates to means for synchronizing a plurality of rotating shafts without the use of mechanical linkages or connections between the shafts. More particularly, the invention is directed to means for assuring that each of a number of remotely located, mechanically independent shafts will start and stop at the same rotational position and will turn through the same number of revolutions.

Such requirements are present, for example, when it is desired to test a relatively complicated apparatus, such as an aircraft, while recording results of the test at various remote locations in the apparatus by means of motion picture cameras. During such tests, as many as 12 or more separate cameras may be employed, and all must be accurately synchronized. If synchronization is not attained, the results of the test may be useless because it will be impossible to match the exposures of one camera to the exposures of another and, though the test results at the various locations will have been recorded, they will not be coordinated as to time.

In such an application, when the present invention is employed, each camera or like device is driven from a constant speed power source, such as a synchronous motor, through a novel quick acting mechanical clutch which stops the driven shaft at a given rotational position when disengaged, which positively engages with negligible time lag and which is substantially free from deleterious slippage or wear over long periods of use, each clutch of the system being combined in a novel electrical control system by which exact synchronism of the several clutches is obtained.

In such a system, synchronization depends both upon the ability of each clutch to always start and stop at a given angular position without slippage or material lag, and upon ability of the control system to engage and disengage all of the clutches simultaneously. Though attempts have been made in the prior art to obtain exact synchronism in systems of the type referred to, such attempts have been successful only when complex and very expensive apparatus was employed. By providing a combination of a novel clutch and electrical control system therefor, the present invention attains exact synchronism of remotely located shafts without employing complicated, costly equipment.

According to a preferred embodiment of the invention, each clutch of the system is normally engaged, and is caused to be disengaged by stopping a control element which rotates with the clutch and shafts when the clutch is engaged. The control element of each clutch carries a dog or detent, and an electrically controlled clutch actuator is provided for each clutch and includes a catch member automatically moved into the path of the detent when the actuator is deenergized, so that the detent is brought into engagement with the catch to disengage the clutch and maintain the same disengaged so long as the clutch actuator is deenergized. All of the clutch actuators of the system are connected in a supply circuit controlled by a single switch, so that energization of the actuators, occurring simultaneously at all clutches in response to operation of the single switch causes the clutches to engage, and their respective shafts to be driven, while deenergization of the clutch actuators causes the clutches to be disengaged simultaneously, and the respective shafts all to be stopped at a definite rotational position, from which definite position all of the shafts begin to rotate when the clutch actuators are next energized.

In such a system, it is obvious that the detent of the control element of each clutch will, within very close limits, be at the same rotational position as the detent of all of the other clutch control elements. The clutch actuators are of course located at a definite position relative to the clutch, the location being the same for each clutch, and it is therefore clear that interposition of the catch members in the paths of the clutch detents will ordinarily cause all clutches to disengage at the same rotational point in the same revolution. The structure of the novel clutch employed is such that, when the clutch is disengaged, the shaft driven thereby is held stationary substantially at the rotational point in which the clutch disengaged.

It is obviously necessary that each clutch be disengaged in the same revolution. But, this may not occur if the clutch actuators are caused to operate at that instant when the detents are passing the point of engagement with the stop members of the actuators. When that occurs, a slight difference in size or shape of the detents may allow one of the detents of the clutches to escape the corresponding stop member, with the result that that clutch and its shaft will turn through an additional revolution before the detent is stopped, while all of the other clutches have stopped at the predetermined point. The same result may occur if one of the shafts is very slightly out of synchronism. Also, where electrically controlled actuators are employed, one actuator may lag enough in its response to allow the corresponding detent to slip past.

The present invention overcomes this difficulty by providing means for preventing the clutch actuators from operating at that instant when the detent or like operating element of the clutch is just passing the actuator. In accordance with a preferred form of the invention, such means comprises a holding circuit which dominates the electrical actuators and operates in response to the rotational position of one of the driven shafts of the system to prevent the clutch actuators from operating to disengage the clutches at that critical instant when the detent or equivalent element is passing the stop member of the actuator. Thus, the single switch dominating all of the actuators determines the approximate time at which the shafts are stopped, and the holding circuit operates to assure that all of the shafts stop in the same revolution. The precise rotational point at which the shafts are stopped is determined by mechanical stop means embodied in the clutch.

The invention further includes means combined with the holding circuit by which any one of the several remote shafts may be selected as the master shaft which all other shafts in the system will follow.

Yet another feature of the invention is the provision, in such a system for synchronizing remotely located shafts, of a radio link in the electrical clutch control.

In order that the invention may be readily understood in detail, reference is made to the accompanying drawings, forming a part of this specification, and in which:

Fig. 5 is a schematic diagram of a synchronized system similar to that shown in Fig. 4 but employing a radio link in the control means.

Figure 1:
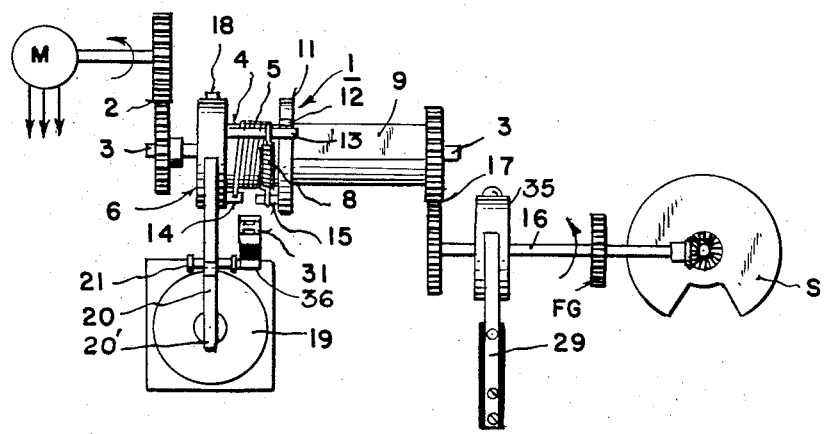
Fig. 1 is a schematic diagram of a single motor, clutch, clutch control and driven shaft unit constructed in accordance with a preferred embodiment of the invention.

Referring now to the drawings, and first to Fig. 1 thereof, it will be seen that the embodiment of the invention there shown includes a synchronous motor M from which the shutter S and film drive gear FG of a motion picture camera, not shown, are driven at a constant speed through a mechanical clutch 1.

Figure 2:
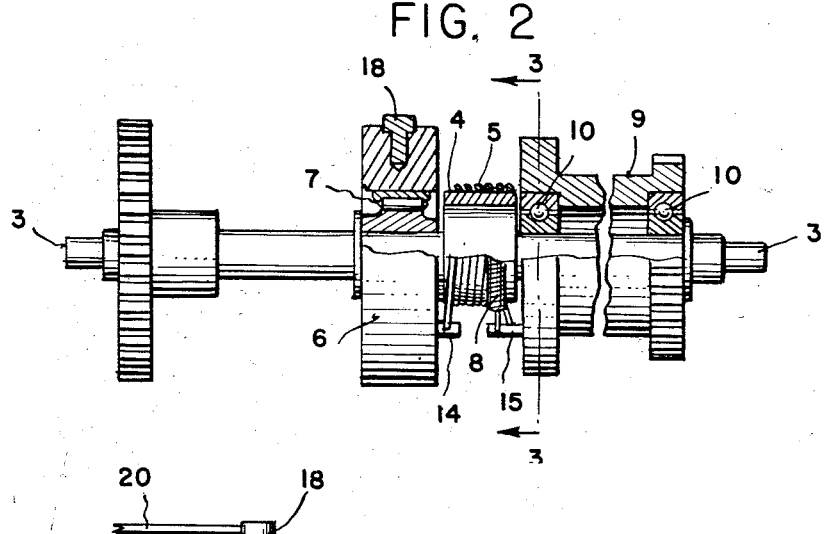
Fig. 2 is a vertical longitudinal sectional view of the clutch assembly of Fig. 1, parts being shown in elevation.
Figure 3:
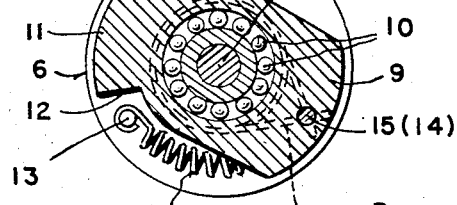
Fig. 3 is a transverse sectional view taken on the line 3—3, Fig. 2.

Suitable input gearing 2 connects the motor M to the clutch shaft 3 upon which, as seen in Fig. 2, there is rigidly carried a drum 4, preferably of silver alloy. A helical torsion spring 5, preferably of beryllium-copper wire, is centered about the drum 4 and has one of its ends attached to a control disc 6 and the other end to the driven member 9 of the clutch. The control disc 6 is carried by a needle bearing 7, Fig. 2, and is therefore free to rotate about the shaft 3, except for the restraining force of the torsion spring 5. The driven member 9 of the clutch 1 is carried on the clutch shaft 3 by suitable free rotating bearings 10. At its end adjacent the clutch drum 4, the driven member 9 is provided with a flange 11 which is cut away to provide a radially extending abutment 12. As will be later described, the abutment 12 cooperates with a stop member or rod 13 secured to and extending from the clutch control disc 6.

As seen in Fig. 1, the ends of the torsion spring 5 are secured respectively to the control disc 6 by a post 14 and to the flange 11 of the driven member 9 by a post 15. The normal internal diameter of the spring 5, that is, its diameter when relaxed, may be made slightly greater than the diameter of the drum 4, and the spring is centered relative to the drum. Thus, it is obvious that so long as the spring 5 is relaxed rotation of the shaft 3 will not be imparted to the driven member 9, since the clutch drum 4 may spin freely within the spring. But, if the spring 5 be tightened on the drum 4 by relative rotary movement of the clutch disc 6 and the driven member 9, rotation of the shaft 3 and the drum is imparted to the driven member 9. And, as the load torque on the driven member 9 increases, the helical spring 5 will become tighter on the drum 4, and slippage will therefore be prevented.

It is preferred that the clutch 1 be normally engaged and to accomplish this a tension spring 8 is provided between the stop rod 13 and the post 15, this tension spring acting to constantly urge the control disc 6 and the driven member 9 in directions causing the torsion spring 5 to be tightened on the drum 4. Thus, as the synchronous motor M drives the clutch shaft 3 at a constant speed through the input gearing 3, the clutch 1 normally transmits rotary motion to the output shaft 16 through the output gearing 17. But, if the rotation of the control disc 6 be stopped, then torsion spring 5 is loosened, the clutch 1 is disengaged so that the shaft 3 can continue to rotate without effect, and the driven member 9 is brought to a positive stop, since the abutment 12 is rotated into contact with the stop rod or pin 13, which latter member is held stationary with the clutch control disc 6. Of course, while the disc 6 is held stationary, the effect of the tension spring 8 is to urge the clutch into re-engagement. This effect is overcome, however, by the opposing force applied as a result of continued rotation of the shaft 3.

The pin 13, coacting with the abutment 12, constitutes a limit stop. When the clutch is caused to disengage, the driven member 9 continues to rotate because of its inertia, and tends to unwind the torsion spring 5. If it were not for the abutment 12 and the pin 13, such unwinding, continuing beyond the relaxed position of the spring 5, would store energy in the spring which would eventually overcome the inertia of the driven member 9, and violent oscillation might result, with possible damage to the clutch and the mechanism driven thereby. It should be noted that, when the control disc 6 is stopped at a given rotational point, the rotational position at which the driven member 9 comes to rest is determined by the spring 5, and not by the limit stop pin 13. And this rotational position will be substantially identical with the position at which the clutch disengaged.

For the purpose of the present invention, it is necessary that there be sufficient friction between the spring 5 and the clutch drum 4 to provide positive engagement and insure against slippage when the clutch is engaged. Yet the materials of the spring 5 and the drum 4 must be such that scoring of their surfaces is prevented over extended periods of operation in which the clutch is disengaged many times and is held disengaged for relatively long periods. It has been found that these ends are met when the drum 4 is made of a silver alloy such as coin or sterling silver, and the spring 5 is made from hard, corrosion-resistant beryllium-copper. This combination provides the necessary high coefficient of friction for quick, positive engagement, yet the lubricating and re-deposition properties of the silver drum are sufficient to prevent material scoring or wear. In tests carried out with the invention herein disclosed, it was found that no measurable wear of the drum or spring resulted after more than 100,000 cycles of operation of the clutch.

Figure 4:
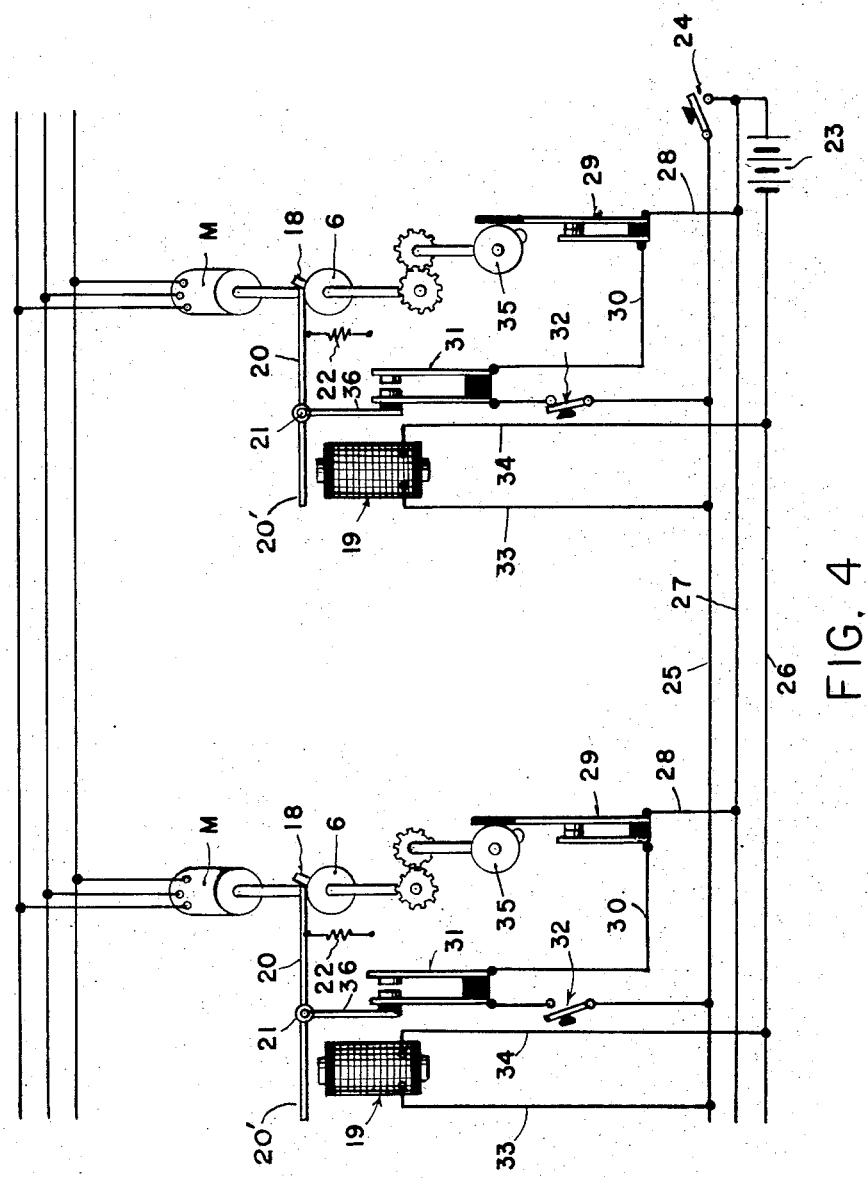
Fig. 4 is a schematic diagram of a synchronized system of two of the units illustrated in Fig. 1, showing the electrical control circuits therefor.

It will be seen that, if the control disc 6 be stopped always at a predetermined rotational or angular position, then the driven member 9 will always be stopped at a given rotational position by the stop pin 13 cooperating with abutment 12 and, since the member 9 is directly geared to the output shaft 16, the shaft 16 also will be always stopped in a predetermined rotational position. On the control disc 6 there is provided a dog or detent 18 in fixed position and exposed on the periphery of the disc. As seen in Figs. 1 and 4, there is positioned adjacent the clutch an electrically operated clutch actuator comprising a solenoid 19 and a catch member 20. The catch member 20 is pivoted at 21 and is normally biased, as by a spring 22, Fig. 4, into the rotational path of the detent 18. The solenoid 19 is so designed that, when energized, it attracts the end 20' of the catch member 20, causing the catch member 20 to swing into a position out of the rotational path of the detent 18. Thus, when the solenoid 19 is deenergized, the catch member 20 always engages the detent at a fixed rotational position, causing the clutch 1 to be disengaged and the driven shaft to be stopped. But, when the solenoid is energized, the catch member 20 is removed from contact with the detent 18, the clutch 1 reverts to its normally engaged position, and the driven shaft is rotated. It should be noted that, since the catch and detent always act in the same rotational position, and the clutch stop means 12 and 13 always stop the driven shaft in the same rotational position, energization of the solenoid 19 starts a rotational cycle of the driven shaft which always has a definite starting point which can be synchronized to other similar units.

In Fig. 4, showing a synchronized system of two of the units just described, it will be seen that the solenoids 19 of the clutch actuators are connected in parallel to an electrical supply circuit comprising a suitable source of current, such as the battery 23, a switch 24, and conductors 25 and 26. Thus, closing of the switch 24 will energize the solenoids 19 simultaneously to remove the catch members 20 from contact with the detents 18 and will cause the two clutches to engage. Opening of the switch 24 will simultaneously deenergize the solenoids 19, causing the catch members to be moved into the paths of the detents 18, and the clutches will thus be simultaneously disengaged. As many clutch actuators as required can be connected in parallel to the supply circuit, and all will be simultaneously operated as just described. Closing of the switch 24 will serve to start all of the shafts in the system rotating from the same angular position, while opening of the switch will stop all of the shafts in the system at the same point.

As previously mentioned, there is always danger in such a system that the switch 24 may be opened at that instant when the detents 18 are just passing the position at which they are to engage their catch members, with the result that one might slip past that point while others are caught, so that one shaft is out of step by one revolution. To avoid this possibility, the present invention embodies a holding or delay circuit dominated by a normally closed switch which is opened by a cam rotated by one of the driven shafts of the system.

Preferably, there is provided a second supply circuit for the solenoids 19, this supply circuit comprising the battery 23, the conductor 26 and a conductor 27. Each solenoid is connected into this second supply circuit by a branch circuit comprising the conductor 28, a normally closed switch 29, the conductor 30, a normally open switch 31, a manual switch 32, a portion of conductor 25, and the conductors 33 and 34.

The normally closed switch 29 of each branch circuit is provided with a cam operator 35 rotated by the driven shaft 16, as seen in Fig. 1, so that the cam 35 causes the switch 29 to be opened momentarily at a definite point in the rotation of the shaft 16. The switch 31 is provided with an operating lever 36 so combined with the pivoted catch member 20 that the operating lever 36 maintains the switch 31 closed only while the solenoid 19 is energized.

Thus, once the switch 24 is closed to energize the solenoids, the parallel branch circuits just described are maintained completed, regardless of whether the switch 24 is opened, until the switch 29 is caused to open by the cam 35.

Each cam 35 is oriented on the shaft 16 in such a manner that the cam will open its switch 29 at a time when the clutch detents 18 are well past the position at which they are engaged by the catch members. For example, if the output gearing 17 has a one-to-two ratio so that the driven member 9 of the clutch rotates twice as rapidly as the shaft 16, then it is desirable to so orient the cam 35 that the cam will open the switch 29 at a point more than 180° after the detent 18 has passed its stop position. This not only assures that the catch member 20 does not descend just as its detent is passing, but also makes certain that the catch member 20 will not be released during an odd half revolution of the cam.

In operation of the system illustrated in Fig. 4, the switch 24 may be opened to disengage the clutches at any time, such as at the end of a test period. Opening of the switch 24 breaks the first supply circuit described, but current is still supplied to the solenoids 19 through the parallel branch circuits including switches 29 and 31, and the solenoids are therefore still energized. But, when the shafts 16 next rotate to a point bringing their cams 35 into engagement with the switches 29, the resultant opening of switches 29 deenergizes all of the solenoids 19, and the catch members 20 are then released by the solenoids and urged by the springs 22 into engagement with the detents 18 to disengage the clutches.

The switch 24 may either be a manual switch, or a mechanically or otherwise operated switch, such as a time switch, as required by the particular use to which the system is put.

The switches 32 in the parallel branches of the holding or delaying circuit are manual switches and are employed to select one of the shaft units as the master unit which all of the other units in the system follow. In preferred practice, the switch 32 of only one unit is closed, all of the other switches being left open, and the corresponding branch circuit, through its cam switch 29, dominates all of the solenoids, as seen in Fig. 4.

While the cam 35, Fig. 1, has been shown as carried by the output shaft 16, it will be clear to those skilled in the art that it may be carried by the driven member 9 of the clutch.

Fig. 5 illustrates a synchronized system of two of the shaft units shown in Fig. 1, the two units being indicated at A and B, in which system a radio transmitter-receiver link is interposed in the clutch control line. Here, the synchronous driving motors of the units A and B are supplied from individual controlled frequency alternating current power sources 100 and 200, respectively. The power sources 100 and 200 may be of any suitable conventional type and may, for example, comprise inverters which are controlled by tuning forks or crystals or which are synchronized by means of an additional radio control link.

The clutch actuating solenoid 119 of the unit A, Fig. 5, is supplied from a battery 123 over a first supply circuit comprising the conductors 125 and 126 and a switch 124. The holding circuit for the unit A comprises the conductor 127, the normally closed cam operated switch 129, the conductor 130, the normally open switch 131 and the manual switch 132. The power terminals for a radio transmitter 137 are connected by conductors 138 and 139 across conductors 125 and 126 of the solenoid supply, as shown, so that the transmitter 137 is energized both when the switch 124 is closed and when the switch 124 is open but the switches 129, 131 and 132 are closed but is deenergized when both switch 124 and switch 131 are open. Thus, the unit A, Fig. 5, is arranged precisely as either of the units shown in Fig. 4, except for the presence of the radio transmitter 137 and the special power source for the synchronous motor.

Unit B of the system shown in Fig. 5 is identical to unit A, except that the switch 224, corresponding to the switch 124 of the unit A, is a normally open quick acting relay, the actuating winding of which is energized by the radio receiver 237 only when said receiver detects a signal from the transmitter 137 of the unit A. The receiver 237 may be powered in any suitable manner, as by having its power terminals connected across the battery 223 of the solenoid supply circuit of the unit B, as shown.

It will be noted that while the selector switch 132 in the holding circuit of the unit A is shown closed, the corresponding switch 232 of the unit B is open, so that unit A is selected as the master unit to which the unit B will be synchronized. Of course, the holding circuit in the unit B could be entirely eliminated. But, in actual practice, it is preferable to have each clutch unit, with its solenoid control means, complete, so that it may be employed interchangeably as master or slave. When a radio link is employed, the radio apparatus will ordinarily be mechanically separate from the clutch units.

In operation of the system shown in Fig. 5, closing of the switch 124 energizes the solenoid 119, causing the clutch unit A to be engaged to drive its shaft, in the manner hereinbefore fully described. Simultaneously, the transmitter 137 is energized to transmit a signal to which the receiver 237 of the unit B is tuned. Upon detection of said signal by the receiver 237, the actuating winding of the relay 224 is energized, causing said relay to complete the supply circuit for the solenoid 219, the clutch unit B thus being caused to engage simultaneously with engagement of the clutch unit A.

When the switch 124 of the master clutch unit A is opened, both the solenoid 119 and the transmitter 137 will continued to be supplied with current from the source 123 until the driven shaft of the clutch unit A next reaches a rotational position in which the cam switch 129 is opened. When the cam switch 129 is opened, the solenoid 119 is deenergized, causing the clutch to be disengaged and the shaft driven by the clutch to stop, all as previously described with reference to Figs. 1 and 4. Simultaneously, the transmitter 137 is deenergized. The resulting cessation of the signal from the transmitter 137 causes the relay 224 of the unit B to be deenergized, breaking the supply circuit for the solenoid 219 and thus causing the clutch of unit B to be disengaged and its shaft stopped.

It will be noted that in the systems of both Figs. 4 and 5, there is provided means responsive to a single switch for simultaneously controlling the clutch actuating means of the system.

I claim:

1. In combination in a system for synchronizing the rotation of a plurality of shafts each driven at a predetermined rate from a constant speed power source through a rotary mechanical clutch, a movable control element for each clutch, each clutch including means responsive to the action of the corresponding movable control element for causing said clutch to engage at a given rotational position when said control element is in a first position and to disengage at said given rotational position when said control element is in a second position, each clutch also including means for stopping the shaft driven thereby when the clutch is disengaged, said movable control elements each being normally biased to one of said positions, electrical actuating means for each movable control element operable when energized to actuate the control element to the other of said positions, a single switch, electrical means responsive to the action of said single switch for simultaneously energizing all of said actuating means, a holding circuit connected to said actuating means, means responsive to energization of said actuating means for energizing said holding circuit, and means responsive to the rotational position of one of said shafts for interrupting said holding circuit only when all of the rotary clutch members have rotated beyond said given rotational position, said holding circuit when energized being independent of said single switch.

2. In combination in a system for synchronizing the rotation of a plurality of shafts each driven at a predetermined speed through a normally engaged mechanical clutch, each clutch of the system including a control element which rotates when the clutch is engaged and means causing the clutch to disengage when said control element is prevented from rotating, each clutch of the system also including means for stopping the rotation of the shaft driven by the clutch at a definite rotational point upon disengaging of the clutch, a catch member for each clutch of the system, each of said catch members being movable into the rotational path of the control element of the corresponding clutch to engage and stop said element at a definite rotational position, a single switch, electrically controlled actuating means responsive to the action of said single switch for simultaneously moving all of said catch members into the paths of their corresponding clutch control elements when said switch is in a first position and out of said paths when said switch is in a second position, a holding circuit dominating said actuating means, means responsive to energization of said actuating means for completing said holding circuit, and switch means responsive to the rotational position of one of said shafts arranged to complete said holding circuit only when said control elements are passing said definite rotational position, said holding circuit when energized being independent of said single switch.

3. In combination in a system for synchronizing the rotation of a plurality of shafts each driven at a predetermined speed through a normally engaged rotary mechanical clutch, each clutch including stop means for disengaging the clutch and stopping the driven shaft, an exposed stop operating element on each clutch of the system arranged to operate the clutch stop means whenever the stop operating element is prevented from rotating with the clutch; a catch member normally biased into the rotational path of each of said stop operating elements, whereby in each clutch rotation of the clutch brings its stop operating element into engagement with the corresponding catch member to cause the clutch to be disengaged and the driven shaft stopped at a predetermined rotational position established by the location of the catch member; electrical actuating means for each catch member operable when energized to actuate the catch member to an inactive position; a single switch; means responsive to operation of said single switch for simultaneously energizing all of said actuating means, a holding circuit connected to energize said actuating means, means responsive to energization of said actuating means for completing said holding circuit, and switch means responsive to the rotational position of one of said shafts arranged to complete said holding circuit while the stop operating elements of said clutches are being rotated past their catch members and to interrupt said holding circuit at all other times, said holding circuit when energized being independent of said single switch.

4. In combination in a system for synchronizing the rotation of a plurality of shafts each driven at a predetermined speed through a normally engaged rotary mechanical clutch, each clutch including stop means for disengaging the clutch and stopping the driven shaft, an exposed stop operating element on each clutch of the system arranged to operate the clutch stop means whenever the stop operating element is prevented from rotating with the clutch; a catch member normally biased into the rotational path of each of said stop operating elements, whereby in each clutch rotation of the clutch brings its stop operating element into engagement with the corresponding catch member to cause the clutch to be disengaged and the driven shaft stopped at a predetermined rotational position established by the location of the catch member; electrical actuating means for each catch member operable when energized to actuate the catch member to an inactive position; a single switch; an electrical circuit responsive to operation of said single switch for simultaneously energizing all of said actuating means, a holding circuit connected to energize said actuating means; means for completing said holding circuit in response to energization of said actuating means, and switch means responsive to the rotational position of one of said driven shafts and arranged to complete said holding circuit during that portion of each revolution of said shaft during which said stop operating elements pass their catch members and to interrupt said holding circuit, to allow de-energization of said actuating means, during the balance of each revolution of the shaft, said holding circuit when energized being independent of said single switch.

5. In a system for synchronizing the rotation of a plurality of shafts, a synchronous motor for each shaft; a normally engaged mechanical clutch connecting each shaft to its motor, each clutch including a rotating member having an exposed detent and being disengaged when said detent is prevented from rotating; means in each clutch for stopping the corresponding shaft when the clutch is disengaged; a catch element positioned adjacent each clutch and biased to engage the exposed detent of the clutch at a predetermined rotational position; electrical actuating means for each catch element operable when energized to move the catch element to inactive position; a single switch; means controlled by said single switch for simultaneously energizing all of said actuating means, a holding circuit connected to energize said actuating means, switch means arranged to interrupt said holding circuit until said actuating means have been energized by operation of said single switch, and other switch means responsive to the rotational position of one of said shafts for interrupting said holding circuit only when said detents are rotationally displaced from their corresponding catch elements, said holding circuit when energized being independent of said single switch.

6. In a system for synchronizing the rotation of a plurality of shafts; a synchronous motor for each shaft; a normally engaged clutch connecting each shaft and motor, each clutch including an exposed clutch release element and means operable to disengage the clutch when said release element is prevented from rotating with the clutch; means in each clutch for stopping the corresponding shaft when the clutch is disengaged; a catch member mounted adjacent each clutch, each of said catch members being normally biased into the rotational path of the release element of the corresponding clutch; a solenoid for each catch element, each solenoid being positioned to actuate its catch element to an inactive position when energized; a single switch; a supply circuit controlled by said single switch, said solenoids being connected to said supply circuit in parallel; a second supply circuit independent of said single switch, said solenoids being connected in said second supply circuit through parallel branch circuits each including a normally open switch and a normally closed switch; means controlled by energization of said solenoids for closing said normally open switches, whereby a holding circuit independent of said single switch is completed, and means controlled by the rotational position of one of said driven shafts for opening said normally closed switches only after the release elements of said clutches have been rotated beyond their catch elements.

7. A system constructed in accordance with claim 6, wherein the parallel branch circuits of said second supply circuit each include a manually operated switch connected in series with said normally open and normally closed switches.

8. In a system for synchronizing the rotation of a plurality of shafts each driven at a predetermined speed through a normally engaged mechanical clutch, each clutch including a stop device for disengaging the clutch and stopping the driven shaft at a predetermined rotational position, the combination of an electrically operated stop actuating device for each clutch of the system, each of said stop actuating devices when deenergized being biased to a position to actuate the clutch stop device of the corresponding clutch and being moved to an inactive position when energized; a first electrical supply circuit for energizing all of the electrically operated stop actuating devices in the system, said devices being connected to said supply circuit in parallel; a circuit interrupter in said first supply circuit for simultaneously controlling said stop actuating devices; a second electrical supply circuit for energizing all of the electrically operated stop actuating devices of the system, said second supply circuit including for each stop actuating device a parallel branch circuit including in series a normally open switch and a normally closed switch; means combined with each stop actuating device for maintaining the normally open switch of the corresponding branch circuit closed while the stop actuating device is energized, and means responsive to rotation of each driven shaft for opening the normally closed switch of the corresponding branch circuit only when the driven shaft has rotated a definite angular distance beyond the predetermined rotational position at which the clutch for the shaft is disengaged.

9. In a system for synchronizing the rotation of a plurality of shafts each driven at a predetermined speed through a normally engaged mechanical clutch, each clutch including a stop device for disengaging the clutch and stopping the driven shaft at a predetermined rotational position, the combination of an electrically operated stop actuating device for each clutch of the system, each of said stop actuating devices when deenergized being biased to a position to actuate the clutch stop device of the corresponding clutch and being moved to an inactive position when energized; a first electrical supply circuit for energizing all of the electrically operated stop actuating devices in the system, said devices being connected in parallel to said supply circuit and said circuit including a circuit interrupter for simultaneously controlling said stop actuating devices; a second electrical supply circuit for energizing all of the electrically operated stop actuating devices of the system, said second supply circuit including for each stop actuating device a parallel branch circuit including in series a normally open switch, a normally closed switch, and a manually operated switch; means combined with each stop actuating device for maintaining the normally open switch of the corresponding branch circuit closed while the stop actuating device is energized, and means responsive to rotation of each driven shaft for opening the normally closed switch of the corresponding branch circuit only when the driven shaft has rotated a definite angular distance beyond the predetermined rotational position at which the clutch for the shaft is disengaged.

10. In combination, a plurality of rotatable shafts located remote from each other and each driven at the same predetermined rate through a normally engaged mechanical clutch by a constant speed power source, each clutch including a detent which rotates with the shaft driven by the clutch when the clutch is engaged, each clutch also including mechanism causing the clutch to be disengaged and the shaft driven by the clutch to be stopped when the detent of the clutch is held stationary; electrically operated catch devices each arranged to be moved into engagement with the detents of one of said clutches to stop the same; a single switch; electrical means responsive to the operation of said single switch for simultaneously controlling all of said electrically operated catch devices; a holding circuit in which all of said electrically operated catch devices are connected in parallel, and switch means in said holding circuit and responsive to the rotational position of one of said shafts for preventing said electrically operated catch devices from being operated to engage said detents whenever said shafts are passing through a predetermined arc of their revolutions, said predetermined arc including the point of engagement of said catch members with said detents.

11. In combination in a system for synchronizing a plurality of rotatable shafts located remote from each other and each driven at the same predetermined rate through a normally engaged clutch by a constant speed power source, each clutch including a detent which rotates with the shaft driven by the clutch when the clutch is engaged and mechanism causing the clutch to be disengaged and the shaft driven by the clutch to be stopped when said detent is held stationary; a plurality of electroresponsive catch devices each arranged to be moved into engagement with the detents of one of said clutches to stop the same; first and second circuit means each connected to energize said electroresponsive catch devices; switch means maintaining said second circuit means deactivated until energization of said electroresponsive catch devices by said first circuit means, and other switch means responsive to the rotational position of one of said shafts and connected to complete said second circuit means only while said shafts are passing through a predetermined arc of their revolutions, said predetermined arc including the point of engagement of said catch members with said detents, said second circuit means when activated being independent of said first circuit means.

References Cited in the file of this patent

UNITED STATES PATENTS

| Number | Name | Date |
|---|---|---|
| 1,593,164 | Ehrart | July 20, 1926 |
| 1,963,155 | Litchfield | July 31, 1934 |
| 2,380,542 | Nolde | July 31, 1945 |
| 2,475,432 | Marihart | July 5, 1949 |